(12) United States Patent
Takemura et al.

(10) Patent No.: US 6,440,232 B1
(45) Date of Patent: Aug. 27, 2002

(54) TOROIDAL-TYPE CONTINUOUSLY VARIABLE TRANSMISSION

(75) Inventors: Hiromichi Takemura; Yasuo Murakami; Nobuo Goto; Takashi Imanishi, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/621,730

(22) Filed: Jul. 21, 2000

(30) Foreign Application Priority Data

Jul. 23, 1999 (JP) .......................................... 11-209849

(51) Int. Cl.[7] .......................... C22C 38/22; C22C 38/24; C23C 8/32

(52) U.S. Cl. ........................ 148/319; 148/906; 384/492

(58) Field of Search ................................. 148/906, 319; 384/492

(56) References Cited

U.S. PATENT DOCUMENTS 5,660,647 A  *  8/1997  Mitamura et al. .......... 148/319

* cited by examiner

Primary Examiner—Deborah Yee
(74) Attorney, Agent, or Firm—Sughrue Mion, PLLC

(57) ABSTRACT

In a toroidal-type continuously variable transmission, at least one of components including inner and outer races of a power roller bearing, an input disk, and an output disk is composed of an alloy steel material containing C: 0.15 to 0.5 wt %, Si: 0.1 to 1.5 wt %, Mn: 0.1 to 1.5 wt %, Cr: 0.5 to 3.0 wt %, and at least one kind selected from Mo: 0.1 to 3.0 wt % and V: 0.1 to 3.0 wt %, a content of 0 in the alloy steel material being set to be not more than 9 ppm; and the surface of the at least one component after carbonitriding, hardening and tempering treatments is set to contain C: 0.8 to 1.2 wt % and N: 0.05 to 0.20 wt %, and the at least one component has surface hardness of Hv 720 or more, and Mo.V carbide/carbonitride, the average particle size of which is in a range of from 50 nm to 500 nm is dispersed and precipitated on a race surface or in a range of from the race surface to a deep position where a maximum shearing stress is generated.

4 Claims, 4 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission for use as a transmission in a vehicle such as a car or the like.

2. Description of the Related Art

Conventionally, as a transmission for a vehicle such as a car or the like, a transmission which has a plurality of gears and changes engagement among these gears so as to transmit torque from an input shaft to an output shaft has been mainstream. In such a conventional gear-type stepwise variable transmission, however, the torque changes stepwise or intermittently at the time of change gear. As a result, there has been such a problem that loss is produced in power transmission or vibration is generated at the time of change gear.

Therefore, recently, a continuously variable transmission in which there is no stepwise or intermittent change in torque at the time of change gear has been put into practical use. In this continuously variable transmission, there is an excellent point that no vibration is generated at the time of change gear or the like and loss in power transmission is lower than that in the above-mentioned gear-type stepwise variable transmission. In addition, the continuously variable transmission is superior in the cost of fuel when it is used in a vehicle. Accordingly, a belt-type continuously variable transmission which is an example of the above-mentioned continuously variable transmission has been put into practical use for a part of passenger cars or the like.

In addition, as another example of the continuously variable transmission, there has been proposed a toroidal-type continuously variable transmission constituted by an input disk which rotates while interlocking with an input shaft, an output disk which rotates while interlocking with an output shaft, and a power roller bearing which is in rotary contact with these input and output disks.

This toroidal-type continuously variable transmission can transmit high torque in comparison with the above-mentioned belt-type continuously variable transmission. Therefore, the toroidal-type continuously variable transmission is regarded as effective particularly as a continuously variable transmission for a medium-sized or large-sized vehicle.

However, since such a toroidal-type continuously variable transmission is required to transmit higher torque, the input or output disk or the power roller bearing suffers very large repeated bending stress or very large repeated shearing stress in comparison with mechanical parts such as general gears, bearings and soon to which usual repeated stress is applied.

In the case of a general bearing, the number of balls is about 10 and these balls share a load equally. Shoulder portions of inner and outer peripheral portions of the bearing are supported by a shaft and a housing. Therefore, bending stress is extremely small.

On the other hand, in the case of the toroidal-type continuously variable transmission, each disk comes into contact with the power roller at two places so that two- or three-point press is produced. In addition, the disk is supported on an inner peripheral portion and an end surface near the inner peripheral portion. Therefore, particularly when the contact point comes to the outer periphery side of the disk, the value of the bending stress becomes extremely high in comparison with that in the general bearing.

Figure 4A:
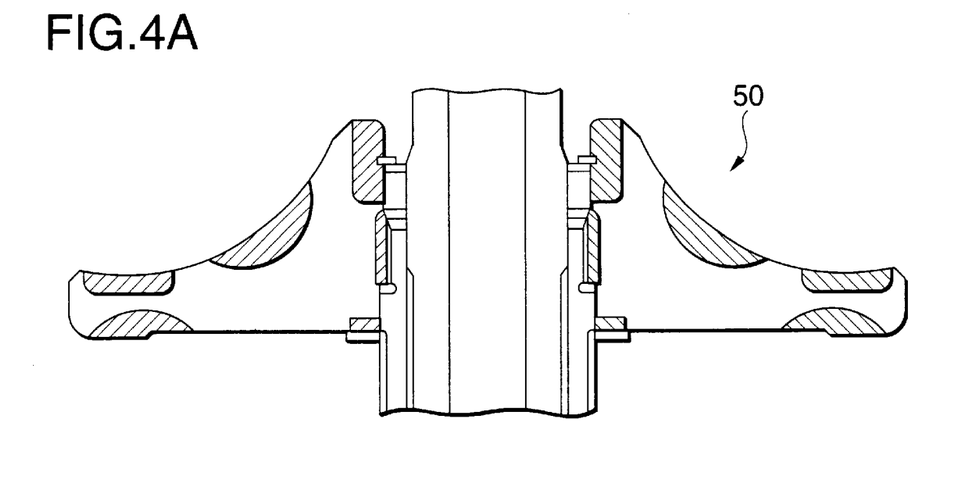
FIGS. 4A to 4C are sectional views showing a disk of a toroidal-type continuously variable transmission, a power roller bearing, and a general roller bearing.
Figure 4B:
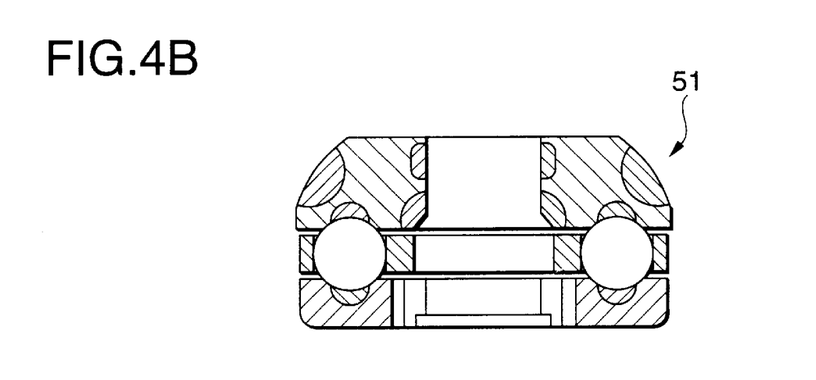
Figure 4C:
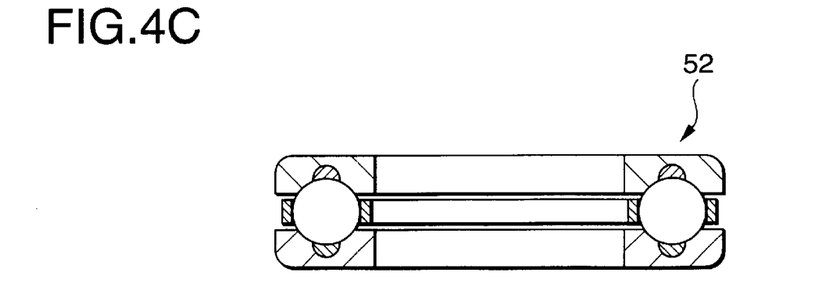

FIGS. 4A to 4C show a disk 50 and a power roller bearing 51 of a toroidal-type continuously variable transmission, and a general roller bearing 52, where hatched portions designate stress suffering portions.

According to FEM analysis upon some specified disks of toroidal-type continuously variable transmissions, there appear portions where the pulling stress is in a range of from 70 kgf/mm$^2$ to 80 kgf/mm$^2$ in response to the input of 370 N·m. Therefore, the allowable stress varies much in accordance with the values of residual compressive stress, hardness and surface roughness in such a portion.

A general bearing is usually used with contact surface pressure Pmax in a range of from 2 GPa to 3 GPa, while a toroidal-type continuously variable transmission is usually used with contact surface pressure of a traction portion in a range of from 2.5 GPa to 3.5 GPa. Particularly at the time of maximum speed reduction, the contact surface pressure of an input disk reaches 3.9 GPa in some specified toroidal-type continuously variable transmissions.

In a single-row ball bearing in which disks have substantially the same outer diameter, for example, in a 6315 ball bearing (outer diameter: 160 mm), a calculated contact ellipse has a major diameter of 6.86 mm and a minor diameter of 0.89 mm when the contact surface pressure Pmax reaches a load of 3.9 GPa which is close to a limit.

On the other hand, in a traction portion of a toroidal-type continuously variable transmission with some specifications, a contact ellipse has a major diameter of 5.15 mm and a minor diameter of 1.33 mm when the reduction ratio is 2.0, the input torque is 370 N.m, and the contact surface pressure Pmax on the input disk side is 3.9 GPa. When the contact surface pressure Pmax on the output disk side is 2.93 GPa under the same conditions, a contact ellipse has a major diameter of 4.77 mm and a minor diameter of 1.91 mm.

Thus, in the case of the toroidal-type continuously variable transmission, the minor diameter of the contact ellipse becomes larger than that in the general bearing. Therefore, there is required a surface hardening layer (Zo) which is deep enough to prevent the maximum shearing stress portion from causing fatigue failure.

Since the toroidal-type continuously variable transmission transmits power through the shearing stress of traction oil, high heat is generated in a contact portion thereof. The contact point temperature is estimated to exceed 200° C., and the oil film thickness has a value of comma several microns on calculation.

Since spin is inevitably present in the toroidal-type continuously variable transmission structurally, heat is generated. Although spin is produced even in an angular bearing or a thrust ball bearing so that heat is generated, the toroidal-type continuously variable transmission differs much from the general bearing in the point where power of about 50 kw is transmitted per small contact ellipse of only about 5 mm×1.5 mm. Therefore, the proof stress in a contact portion has to be higher than that in the general bearing.

Thus, it is necessary to transmit very high torque in the toroidal-type continuously variable transmission. Therefore, the input and output disks and the inner and outer races of the power roller bearing which are constituent members of the toroidal-type continuously variable transmission, should be manufactured with material having higher durability than that of conventional general mechanical parts.

SUMMARY OF THE INVENTION

It is therefore an object of the present invention to provide a toroidal-type continuously variable transmission which can satisfy such a request.

According to the invention, there is provided a toroidal-type continuously variable transmission, comprising: an input disk interlocking with an input shaft; an output disk interlocking with an output shaft; and a power roller bearing including an inner race, an outer race and a plurality of rolling elements, the inner race engaging with the input disk and the output disk to thereby transmit power of the input shaft to the output shaft. At least one of components of the toroidal-type continuously variable transmission including the inner and outer races of the power roller bearing, the input disk and the output disk is composed of an alloy steel material containing C: 0.15 to 0.5 wt %, Si: 0.1 to 1.5 wt %, Mn: 0.1 to 1.5 wt %, Cr: 0.5 to 3.0 wt %, and at least one kind selected from Mo: 0.1 to 3.0 wt % and V: 0.1 to 3.0 wt %, a content of O in the alloy steel material being set to be not more than 9 ppm. The surface of the at least one of components after carbonitriding, hardening and tempering treatments is set to contain C: 0.8 to 1.2 wt % and N: 0.05 to 0.20 wt %. The at least one of components has surface hardness of Hv 720 or more. And, Mo.V carbide/carbonitride, the average particle size of which is in a range of from 50 nm to 500 nm is dispersed and precipitated on a race surface or in a range of from the race surface to a deep position where a maximum shearing stress is generated.

DETAILED DESCRIPTION OF THE PREFERRED EMBODIMENTS

A description will be given below of an embodiment of the present invention with reference to FIGS. 1 to 3.

Figure 1:
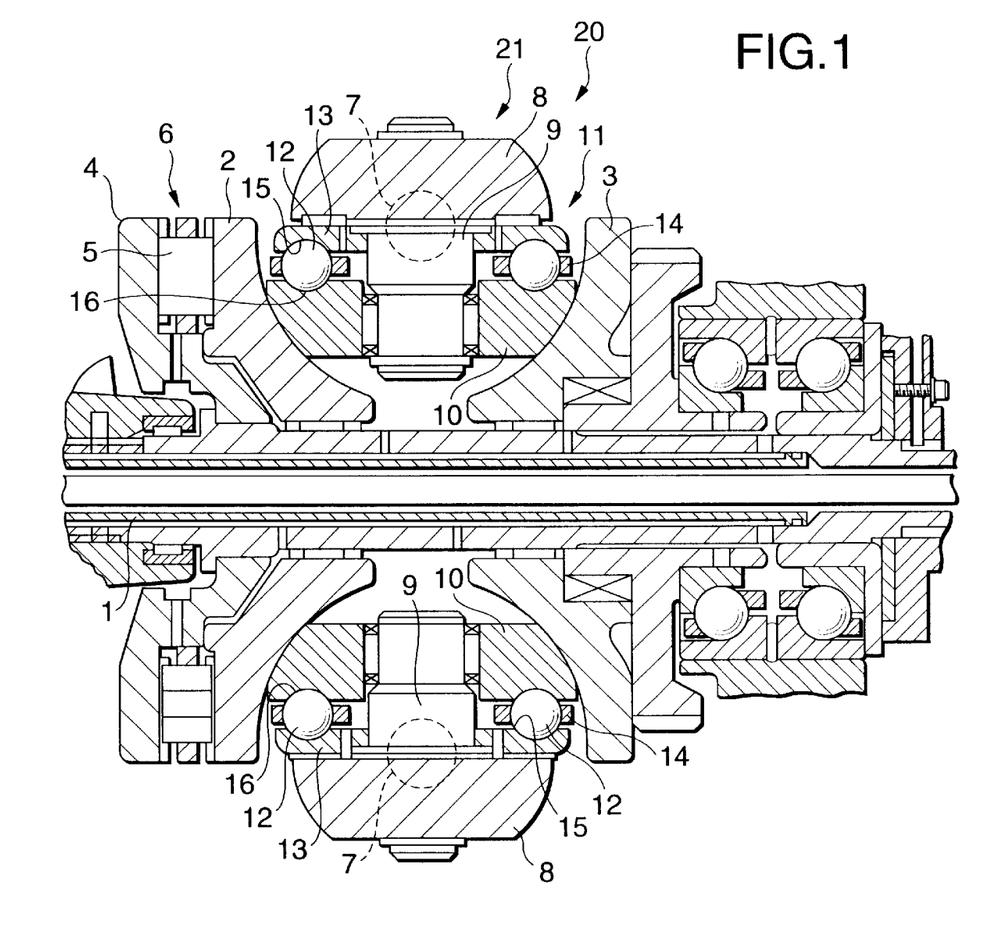
FIG. 1 is a sectional view showing a part of a single-cavity half-toroidal-type continuously variable transmission according to the present invention.

FIG. 1 is a sectional view showing a variator 21 which constitutes a part of a single-cavity half-toroidal-type continuously variable transmission 20 as a half-toroidal-type continuously variable transmission. FIG. 2 is a sectional view showing a variator 31 which constitutes a part of a double-cavity half-toroidal-type continuously variable transmission 30 as a half-toroidal-type continuously variable transmission.

As shown in FIG. 1, the variator 21 of the single-cavity half-toroidal-type continuously variable transmission 20 has an input shaft 1, an input disk 2, an output disk 3, an inner race 10 of a power roller bearing 11, and so on. The input shaft 1 is connected to a driving source (not shown) such as an engine or the like, and rotationally driven by the driving source. The input disk 2 is rotatably supported on the input shaft 1 through a needle bearing while interlocking with the input shaft 1. The output disk 3 rotates while interlocking with an output shaft for extracting power based on the rotation of the input shaft 1. The inner race 10 of the power roller bearing 11 rotates in contact with the input and output disks 2 and 3.

On the back surface side of the input disk 2, a loading cam mechanism 6 is provided as a pressing mechanism for pressing the input disk 2 toward the output disk 3. The loading cam mechanism 6 has a cam disk 4 and a roller 5. The cam disk 4 is in spline engagement with the input shaft 1, and the roller 5 is provided between the cam disk 4 and the input disk 2.

A trunnion 8 swinging about a pivot 7 is provided between the input disk 2 and the output disk 3, and a displacement shaft 9 is provided in a center portion of the trunnion 8. Then, the above-mentioned power roller bearing 11 is supported rotatably on the displacement shaft 9. The power roller bearing 11 has a traction portion which abuts against the input disk 2 and the output disk 3, so that the power roller bearing 11 rotates tiltably between the input disk 2 and the output disk 3 so as to be in contact therewith.

The power roller bearing 11 allows the inner race 10 to rotate, while supporting a thrust load applied from the input disk 2 and the output disk 3. A plurality of balls 12 as rolling elements in the power roller bearing 11 configured thus are held in an annular holder 14 which is provided between an annular outer race 13 provided on the trunnion 8 side and the inner race 10 as a rotary portion.

Further, running grooves 15 and 16 for rollably holding the balls 12 are respectively provided in the outer race 13 and inner race 10. The running grooves 15 and 16 are formed into an annular and sectionally arc shape in the surfaces where the outer and inner races 13 and 10 are in contact with the balls 12.

Next, a description will be given of a variator 31 of a double-cavity half-toroidal-type continuously variable transmission 30 shown in FIG. 2. Constituent parts the same as those in the single-cavity half-toroidal-type continuously variable transmission 20 shown in FIG. 1 are referenced correspondingly.

Figure 2:
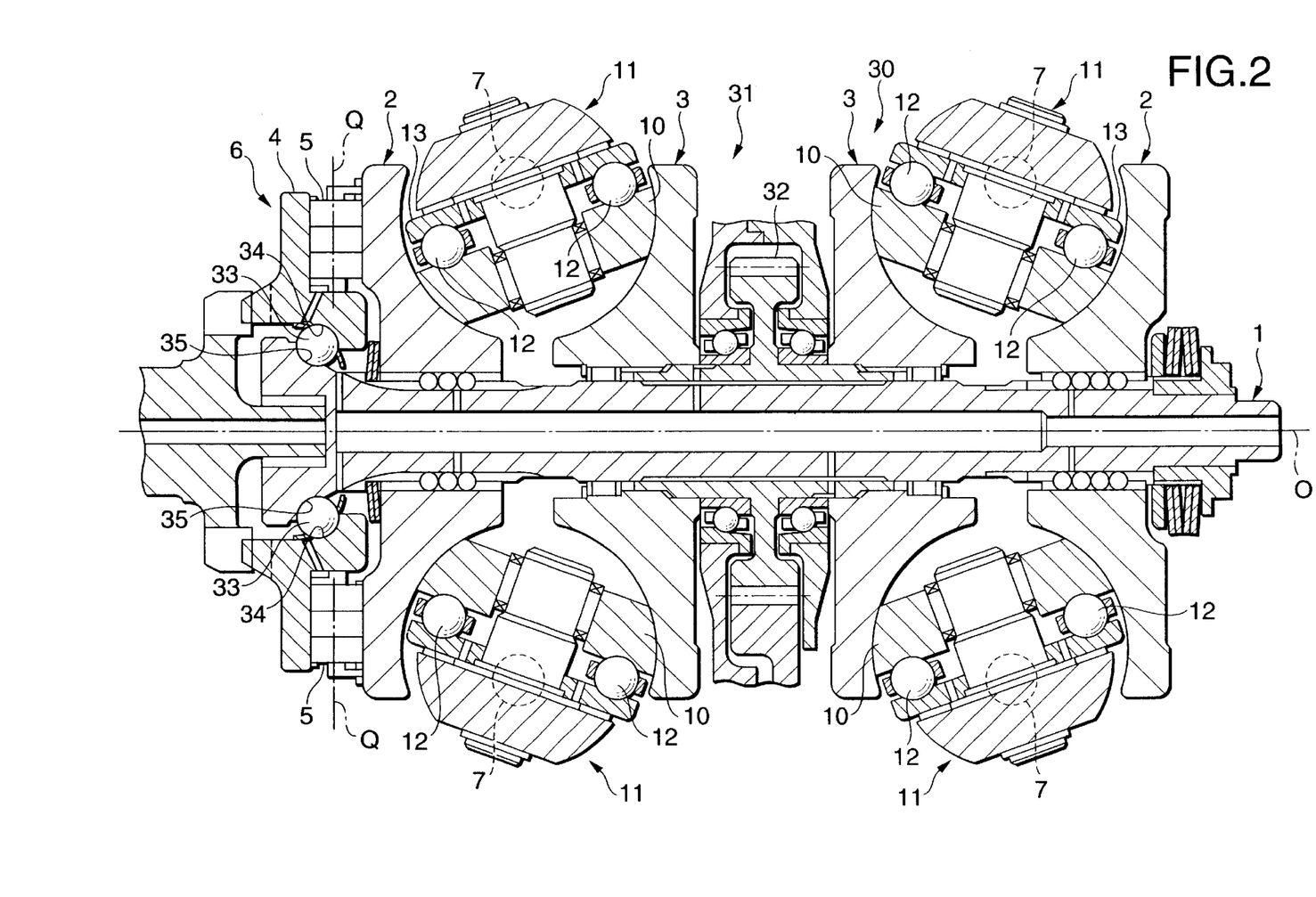
FIG. 2 is a sectional view showing a part of a double-cavity half-toroidal-type continuously variable transmission according to the present invention.

As shown in FIG. 2, the variator 31 of the double-cavity half-toroidal-type continuously variable transmission 30 has a pair of input disks 2 and 2, a pair of output disks 3 and 3, and a plurality of power roller bearings 11. The input disks 2 and 2 are provided at a distance from each other and in opposition to each other. The input disks 2 and 2 are disposed coaxially with each other. The input disks 2 and 2 are supported coaxially with an input shaft 1 so as to rotate while interlocking with the input shaft 1 respectively.

The output disks 3 and 3 are provided between the pair of input disks 2 and 2 so as to be opposed to the input disks 2 and 2 and fitted to the input shaft 1, respectively. The output disks 3 and 3 are disposed coaxially with each other so as to rotate synchronously with each other. The output disks 3 and 3 are provided so as to interlock with an output gear 32 disposed coaxially with the output disks 3 and 3. This output gear 32 is configured to rotate while interlocking with an output shaft for extracting power based on the input shaft 1.

The plurality of power roller bearings 11 are supported between the input disks 2 and 2 and the output disks 3 and 3 respectively so as to be swingable about a pivot 7. Each of the power roller bearings 11 has an inner race 10 which is rotatable in contact with the input disks 2 and 2 and the output disks 3 and 3.

A loading cam mechanism 6 as a pressing mechanism is provided on the back surface side of one of the pair of input disks 2 and 2. The loading cam mechanism 6 has a disk-like cam disk 4 and a roller 5.

The cam disk 4 is disposed coaxially with the input disks 2 and 2, and so on. Balls 33 are provided between the cam disk 4 and the input shaft 1. Sectionally arc guide grooves 34 and 35 are provided in the portions where the cam disk 4 and the input shaft 1 abut against the balls 33 respectively.

The roller 5 is rotatable around an axis Q which intersects an axis O of the input shaft 1, for example, perpendicularly. When the roller 5 rotates around the axis Q, the loading cam mechanism 6 presses the input disks 2 and 2 toward the output disks 3 and 3.

In the variator 31 of the double-cavity half-toroidal-type continuously variable transmission 30 configured thus, the loading mechanism 6 presses the input disks 2 and 2 toward the output disks 3 and 3 so that rotary driving force is transmitted from the input shaft 1 to the output shaft through the input disks 2 and 2, the inner race 10 of the power roller bearing 11, the output disks 3 and 3, and the output gear 32.

In the toroidal-type continuously variable transmissions 20 and 30 configured thus, at least one of the input and output disks 2 and 3 thereof and the inner and outer races 10 and 13 of the power roller bearing 11 is manufactured by a steel material which contains C in a range of from 0.15% to 0.5%, Si in a range of from 0.1% to 1.5%, Mn in a range of from 0.1% to 1.5%, Cr in a range of 0.5% to 3.0%, and at least one kind selected from Mo in a range of from 0.1% to 3.0% and V in a range of from 0.1% to 3.0% in terms of weight percentages as alloy composition components, and the content of O in the steel material is set to be not more than 9 ppm. In addition, the steel material is set so that the surface contents of C and N after carbonitriding, hardening and tempering treatments satisfy specified values, that is, the surface content of C is in a range of from 0.8% to 1.2% and the surface content of N is in a range of from 0.05% to 0.20% in terms of weight percentages, and the surface hardness satisfies Hv 720or more, while Mo.V carbide/carbonitride ($M_7C_3$ or $M_{23}C_6$ series) the average particle size of which is in a range of from 50 nm to 500 nm is dispersed and precipitated on the race surface or in the position which is deep from the race surface enough to generate a maximum shearing stress.

The content of C (carbon) contained in the steel material has to be not less than 0.15% in order to shorten the time for carbonitriding treatment which is performed for obtaining stable cleanliness as mass production material with a small amount of inclusions which can be considered to be harmful to the life since the life is lowered due to the resistance to breakage/flaking, and for obtaining hardness required for the resistance to rolling fatigue. However, if more than 0.5% of C is contained, there arises a problem that the cracking strength is lowered in a core portion or the dimensional stability is lowered at a high temperature. Therefore, the content of C contained in the steel material is set to be in a range of from 0.15% to 0.5%.

Si (silicon) is an element to improve the effect of delay in white structural deformation appearing under rolling fatigue, and to improve the hardenability. If the content of Si is smaller than 0.1%, the temper-softening resistance is not sufficient. If the content of Si is larger than 1.5%, the workability deteriorates conspicuously. Accordingly, the content of Si is set to be in a range of from 0.1% to 1.5%.

Mn (manganese) is an element which is effective in steel hardenability. If the content of Mn is smaller than 0.1%, the hardenability is insufficient. If the content of Mn exceeds 1.5%, the workability deteriorates. Therefore, the content of Mn is set to be in a range of from 0.1% to 1.5%.

Cr (chromium) is an element which improves the hardenability and accelerates the spheroidization of carbide. It is therefore necessary to set the content of Cr to be not less than 0.5%. If the content of Cr exceeds 3.0%, however, the machinability may be lowered. Accordingly, the content of Cr is set to be in a range of from 0.5% to 3.0%.

Mo (molybdenum) is an element which improves the temper-softening resistance or the bearing hardness by the effect of dispersing fine carbide and which improves the high temperature strength. It is therefore necessary to set the content of Mo to be not less than 0.1%. This is because Mo is added so that the content of C dissolved in the matrix is reduced, and fine Mo carbide is precipitated. However, if the content of Mo exceeds 3.0%, the solubility of Mo becomes insufficient so that carbide is not made fine, and further there is a possibility that the workability deteriorates. Accordingly, the content of Mo is set to be in a range of from 0.1% to 3.0%.

V (vanadium) is an element which precipitates on crystal grain boundaries so as to prevent crystal grains from bulking, and which is bonded with carbon in the steel so as to form fine carbide. With the addition of V, there is an effect that the hardness of a bearing surface layer is improved so that the abrasion resistance becomes good, or there is an effect of trapping hydrogen. If the content of V is not less than 0.1%, such an effect becomes conspicuous. If the content of V exceeds 3.0%, bulky carbide of V is precipitated on crystal grain boundaries so that the pinning effect is lowered, and further the workability and various mechanical properties are deteriorated. Accordingly, the content of V is set to be in a range of from 0.1% to 3.0%.

In addition, Mo or V is subjected to solution treatment so that fine Mo or V carbide ($M_{23}C_6$ or $M_7C_3$ series) can be precipitated while the particle size of the carbide is controlled to be in a range of from 50 nm to 500 nm. As a result, there is produced an effect that the content of C in the matrix is reduced so that the generation of structural deformation caused by the dispersion of C in the matrix fatigue is delayed. This dispersion precipitation effect results in an effect of preventing crack propagation, an effect of improving abrasion resistance, and an effect of trapping hydrogen for the resistance of hydrogen brittleness. It is therefore desirable that 10 or more Mo or V carbide particles are made present per 10 $\mu m^2$ by confirming an electron microscope.

O (oxygen) is an element which produces oxygen inclusions in the steel so that the oxygen inclusions may be fish eyes at the time of bending stress fatigue or may be non-metallic inclusions which reduce the rolling life. Therefore, the upper limit of the content of O is set to be 9 ppm.

Further, P (phosphorus) is an element which reduces the rolling life and the tenacity when P is contained. Therefore, the upper limit of the content of P is set to be 0.02%. In addition, when S (sulfur) is contained, S is an element which improves the machinability but forms sulfur inclusions which reduce the rolling life when S is bonded with Mn. Therefore, the upper limit of the content of S is set to be 0.02%.

a description will be given of the reason why the surface content of C after carbonitriding, hardening and tempering treatments is established to be in a range of from 0.8% to 1.2%. In order to obtain enough strength for the resistance of rolling fatigue, the surface content of C has to be not less than 0.8%. On the other hand, if the surface content of C exceeds 1.2%, it is apt to produce bulky carbide which is apt to be a starting point of cracking. Based on the above fact, a description will be given of the reason why the surface content of N is established to be in a range of from 0.05% to 0.20%. If the surface content of N is not smaller than 0.05%, the tempering resistance is improved, and the strength is enhanced by the effect that fine Mo/V carbide is dispersed and precipitated. If the content surface of N exceeds 0.20%, the abrasion resistance becomes so high that grinding is apt to be difficult, and the brittle cracking strength is also lowered.

A description will be given of another embodiment of the present invention. Steel material having an alloy composition described above is subjected to vacuum hardening or high temperature tempering as heat treatment after carbonitriding treatment, and dehydrogenated by baking effect of the heat treatment, so that the diffusible hydrogen quantity in the steel material is set to be not more than 0.1 ppm, and the retained austenite quantity in the steel material is set to be in a range of from 20 vol % to 45 vol %. At least one of inner and outer races of a power roller bearing, an input disk, and an output disk as constituent elements of a toroidal-type continuously variable transmission is manufactured by use of such steel material.

EXAMPLES

Specimens according to Examples (1 to 10) and specimens according to Comparative Examples (1 to 10) shown in the following Table 1 were manufactured as material used for inner an outer races of power roller bearings, and input and output disks in toroidal-type continuously variable transmissions.

The respective specimens were subjected to one heat treatment selected from the following three kinds of heat treatments A, B and C.

Figure 3A:
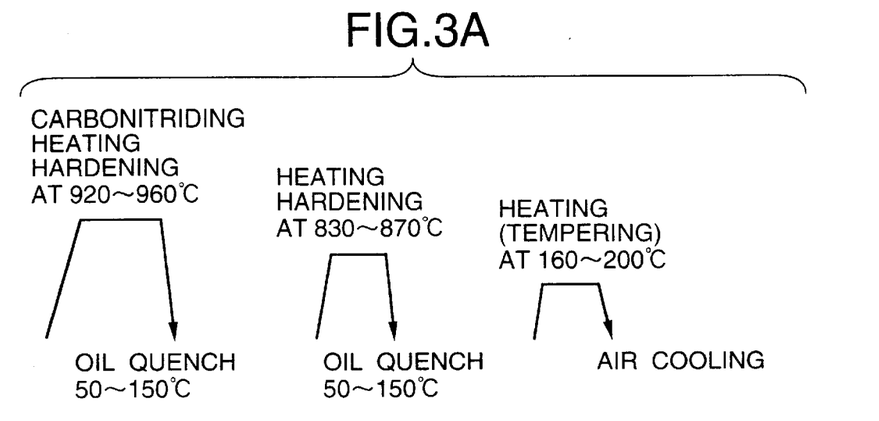
FIGS. 3A to 3C are explanatory diagrams for schematically expressing methods of heat treatments carried out in the present invention.

In the heat treatment A, as shown in FIG. 3A, the specimens were subjected to heat treatment of carbonitriding heating hardening in an atmosphere of endothermic gas, enriched gas and ammonia gas at a temperature of from 920° C. to 960° C. for 5 to 10 hours if the specimens were outer races and for 15 to 30 hours if the specimens were inner races or input/output disks. After that, the specimens were made to stand to cool, and cleansed. Then, the specimens were subjected to oil quenching (hardening) after being heated (through hardening) for 0.5 to 3 hours up to 830 to 870° C. in an atmosphere of endothermic gas. Next, the specimens were cleansed. After this cleansing, the specimens were cooled (tempered) after being heated for 1 to 5 hours in the atmosphere of the air at a temperature in a range of from 160° C. to 200° C.

Figure 3B:
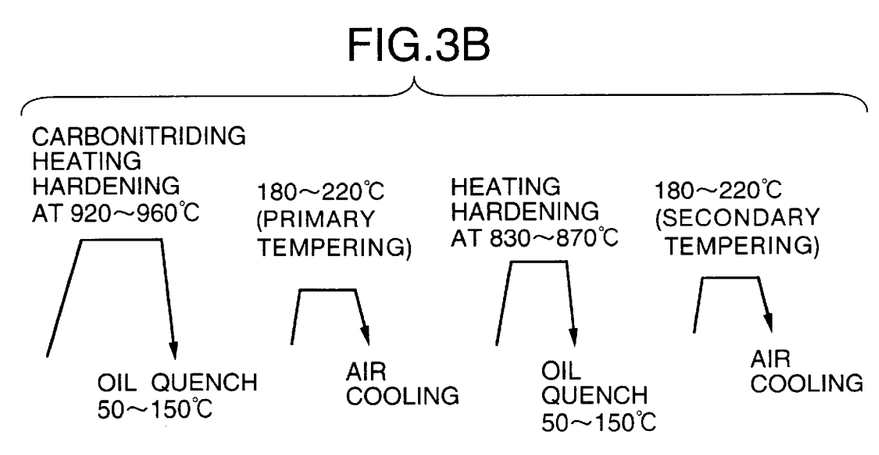

In the heat treatment B, as shown in FIG. 3B, the specimens were subjected to heat treatment of carbonitriding heating hardening in an atmosphere of endothermic gas, enriched gas and ammonia gas at a temperature of from 920° C. to 960° C. for 5 to 10 hours if the specimens were outer races and for 15 to 30 hours if the specimens were inner races or input/output disks. Then, the specimens were cleansed. Then, the specimens were subjected to primary tempering at 180° C. to 220° C., and next subjected to hardening after being heated for 0.5 to 3 hours up to 830 to 870° C. in an atmosphere of endothermic gas. Next, the specimens were cleansed. After this cleansing, the specimens were subjected to cooling (secondary tempering) after being heated for 1 to 5 hours in the atmosphere of the air at a temperature in a range of from 180° C. to 200° C.

Figure 3C:
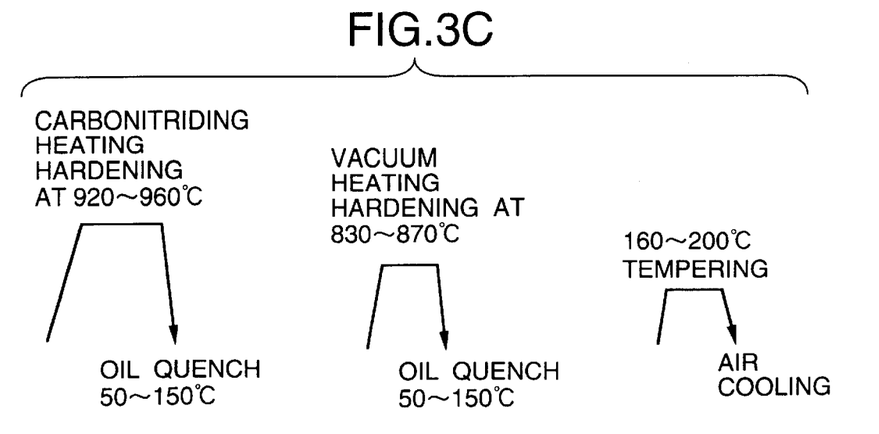

In the heat treatment C, as shown in FIG. 3C, the specimens were subjected to heat treatment of carbonitriding heating hardening in an atmosphere of endothermic gas, enriched gas and ammonia gas at a temperature of from 920° C. to 960° C. for 5 to 10 hours if the specimens were outer races and for 15 to 30 hours if the specimens were inner races or input/output disks. Then, the specimens were made to stand to cool, and cleansed. Then, the specimens were subjected to oil quenching (hardening) after being heated (through hardening) for 0.5 to 3 hours up to 830 to 870° C. in a vacuum atmosphere (in a vacuum furnace) Next, the specimens were cleansed. After this cleansing, the specimens were subjected to cooling (secondary tempering) after being heated for 1 to 5 hours in the atmosphere of the air at a temperature in a range of from 160° C. to 200° C.

Next, variators were assembled by use of the specimens obtained thus. Then, stainless steel powder (74 to 147 μm in particle size) with hardness Hv 500 was mixed into traction oil as foreign matters in such a ratio that 0.005 g of the stainless steel powder were diffused in 1,000 cc of the traction oil. With this traction oil, initial dents were given to input and output disks of the variators, and inner and outer races of power roller bearings. Then, the variators were cleansed sufficiently. The inner and outer races of the power roller bearings were replaced by new specimens, and rolling elements thereof were also replaced by new ones. A test was done on the following test conditions. Incidentally, SUJ2 which was grinding-finished after being through hardening and tempered was used for the rolling elements (balls) of the power roller bearings.

TABLE 1

|  |  | C (%) | Si (%) | Mn (%) | Cr (%) | Mo (%) | V (%) | Surface C (%) | surface N (%) | Heat treatment |
|---|---|---|---|---|---|---|---|---|---|---|
| Examples | 1 | 0.35 | 0.78 | 0.65 | 1.05 | 1.00 | — | 1.10 | 0.07 | A |
|  | 2 | 0.24 | 0.10 | 0.75 | 3.00 | — | 0.10 | 0.99 | 0.15 | A |
|  | 3 | 0.41 | 0.25 | 0.1 | 1.04 | — | 3.00 | 1.08 | 0.05 | A |
|  | 4 | 0.15 | 0.30 | 0.79 | 0.99 | 0.15 | 1.30 | 0.80 | 0.08 | A |
|  | 5 | 0.38 | 1.5 | 0.01 | 0.50 | 3.00 | — | 0.98 | 0.15 | B |
|  | 6 | 0.18 | 0.23 | 1.5 | 1.00 | 0.51 | 0.13 | 0.87 | 0.11 | B |
|  | 7 | 0.50 | 0.15 | 0.66 | 0.97 | 0.10 | — | 1.20 | 0.14 | B |
|  | 8 | 0.35 | 1.20 | 0.81 | 1.02 | 1.51 | — | 1.15 | 0.09 | B |
|  | 9 | 0.34 | 0.31 | 0.65 | 1.46 | 0.77 | 1.25 | 1.10 | 0.16 | C |
|  | 10 | 0.38 | 0.23 | 0.71 | 0.94 | 0.81 | — | 1.00 | 0.20 | C |
| Comparatives | 1 | 0.05 | 0.21 | 0.68 | 0.98 | 0.75 | 0.25 | 0.71 | 0.20 | A |
|  | 2 | 0.35 | 0.31 | 0.71 | 1.00 | — | — | 1.12 | 0.15 | A |
|  | 3 | 0.34 | 0.25 | 0.69 | 0.3 | 0.55 | — | 0.99 | 0.05 | A |
|  | 4 | 0.65 | 0.18 | 0.77 | 1.02 | 1.20 | 0.10 | 1.41 | 0.14 | A |
|  | 5 | 0.40 | 0.30 | 0.80 | 0.97 | 0.06 | — | 0.98 | 0.12 | A |
|  | 6 | 0.39 | 0.02 | 0.03 | 1.11 | 2.50 | 0.25 | 0.86 | 0.11 | B |
|  | 7 | 0.31 | 0.21 | 0.65 | 1.05 | — | 0.07 | 1.02 | 0.16 | B |
|  | 8 | 0.43 | 0.15 | 0.78 | 5.6 | 3.00 | — | 1.20 | 0.10 | B |
|  | 9 | 0.41 | 0.35 | 0.73 | 0.99 | — | 5.12 | 0.91 | 0.05 | B |
|  | 10 | 0.34 | 0.18 | 0.65 | 1.05 | 4.95 | 0.15 | 0.88 | 0.05 | B |

[Test Conditions]
  rotation speed of input shaft: 4,000 rpm
  input torque: 370 N·m
  oil used: traction oil
  oil temperature: 100° C.

On these test conditions, the maximum surface pressure of the power roller bearings reached 3.9 GPa, and Zo became 0.48×1.3 mm=0.624 mm thick. In addition, the maximum surface pressure of the input and output disks reached 4.0 GPa, and Zo became 1.0 mm thick.

The following Table 2 shows the surface hardness (Hv), the retained austenite quantity (%), the Mo/V carbide average particle size (nm), the diffusible hydrogen quantity (ppm), and the life estimation of the respective specimens. Incidentally, the life estimation was based on the time which was taken before occurrence of flaking in one of the outer race of the power roller bearing, the input disk and the output disk constituting the variator, or the time which was taken before occurrence of fatigue cracking in one of the outer race of the power roller bearing, the input disk and the output disk. In addition, when flaking was produced in a rolling element (ball) of the power roller bearing during the test, the rolling element was replaced by a new one, and the test was continued. In addition, the test was terminated upon passage of 100 hours.

tural deformation was produced in the ratio of 1/10–2/10 in the specimens of disks.

In the specimens according to Examples 5 to 7 treated in the method of the heat treatment B, fine carbide/carbonitride, the particle size of which was in a range of from 53 nm to 497 nm was dispersed and precipitated on the race surface, and the diffusible hydrogen quantity in the steel was reduced to 0.1 ppm or lower by baking in tempering which was performed twice. As a result, core-starting flaking and cracking caused by white structural deformation were restrained.

However, since the retained austenite quantity on the race surface was 20%, the L10 lives were 92, 90 and 93 hours, and surface-starting flaking was produced at the ratio of 1/10–2/10 in the specimens of disks.

In the specimens according to Examples 8 to 10 treated in the method of the heat treatment C, the retained austenite quantity on the race surface was in a range of from 25% to 45%, fine Mo/V carbide/carbonitride was dispersed and precipitated near the race surface with a particle size of 300 nm, 125 nm or 265 nm, and the diffusible hydrogen quantity in the steel was not more than 0.05 ppm. Thus, even when 100 hours have passed, no flaking or no cracking was produced in any of the specimens of disks and power roller bearings.

On the other hand, in the specimens according to Comparative Example 1, the content of C in the base was small

TABLE 2

| | | surface hardness (Hv) | retained austenite quantity (%) | average particle size of Mo/V carbide (nm) | diffusible hydrogen quantity (ppm) | L10 life time (hr) | flaking state number |
|---|---|---|---|---|---|---|---|
| Examples | 1 | 793 | 25 | 236 | 0.25 | 88 | 1/10, starting at disk core |
| | 2 | 754 | 30 | 50 | 0.84 | 83 | 2/10, starting at disk core |
| | 3 | 761 | 40 | 500 | 0.18 | 89 | 1/10, starting at disk core |
| | 4 | 720 | 45 | 351 | 0.51 | 84 | 2/10, starting at disk core |
| | 5 | 815 | 20 | 497 | 0.07 | 92 | 1/10, starting at disk dent |
| | 6 | 735 | 20 | 125 | 0.08 | 90 | 2/10, starting at disk dent |
| | 7 | 850 | 20 | 53 | 0.09 | 93 | 2/10, starting at disk dent |
| | 8 | 825 | 25 | 300 | 0.02 | 100 or more | nothing |
| | 9 | 784 | 35 | 125 | 0.01 | 100 or more | nothing |
| | 10 | 773 | 45 | 265 | 0.04 | 100 or more | nothing |
| Comparatives | 1 | 657 | 35 | 135 | 0.85 | 5 | 10/10, starting at disk core |
| | 2 | 736 | 40 | — | 0.35 | 9 | 10/10, starting at disk core |
| | 3 | 581 | 55 | 103 | 0.65 | 8 | 10/10, starting at disk core |
| | 4 | 880 | 30 | 293 | 0.18 | 23 | 10/10, starting at disk surface |
| | 5 | 732 | 45 | 32 | 0.50 | 14 | 10/10, starting at disk core |
| | 6 | 699 | 20 | 351 | 0.09 | 10 | 10/10, starting at disk core |
| | 7 | 754 | 20 | 44 | 0.08 | 13 | 10/10, starting at disk core |
| | 8 | 834 | 8 | 823 | 0.07 | 20 | 10/10, disk mixture |
| | 9 | 810 | 10 | 721 | 0.08 | 23 | 10/10, disk mixture |
| | 10 | 805 | 10 | 880 | 0.06 | 21 | 10/10, disk mixture |

As shown in Table 2, in the specimens according to Examples 1 to 4 treated in the method of the heat treatment A, the retained austenite quantity was in a range of from 25% to 45%. It was therefore possible to restrain surface-starting flaking caused by an initial dent. Further, since fine carbide/carbonitride the particle size of which was in a range of from 50 nm to 500 nm were dispersed and precipitated near the race surface, the L10 lives became three or four times or more as long as those of the specimens according to Comparative Examples 1 to 10 by the crack propagation prevention effect and the pinning effect which prevented hydrogen invasion.

However, since the diffusible hydrogen quantity in the steel was in a range of from 0.18 ppm to 0.84 ppm due to baking in tempering, core-starting flaking with white structo be 0.05%, and the surface hardness was insufficient to be Hv 657. As a result, at the ratio of 10/10 in the specimens of disks, the L10 life was short to be 5 hours, and core-starting flaking with white structural deformation was produced.

In the specimens according to Comparative Example 2, since neither Mo nor V was loaded, fine carbide was not precipitated near the race surface, and the L10 life was short to be 9 hours. In addition, core-starting flaking with white structural deformation was produced at the ratio of 10/10 in the specimens of disks.

In the specimens according to Comparative Example 3, since the loading of Cr was small to be 0.3% so that the retained austenite quantity was large to be 55%, slight improvement of hardness due to the dispersion precipitation effect of carbide was recognized. However, since the hardness of the matrix was low to be Hv 681, the L10 life was 8 hours, and core-starting flaking with white structural deformation was produced at the ratio of 10/10 in the specimens of disks.

In the specimens according to Comparative Example 4, the content of C in the base was high to be 0.65%, and the content of C after carbonitriding treatment was also high to be 1.41%, so that bulky carbide was precipitated on the race surface. As a result, the L10 life was 23 hours, and surface-starting flaking was produced at the ratio of 10/10 in the specimens of disks.

In the specimens according to Comparative Examples 5 and 7, the loadings of Mo and V were small to be 0.06% and 0.07%. Accordingly, the average particle size of fine carbide was small to be 32 nm and 44 nm, and only 6 particles per $10 \mu m^2$ were confirmed. The L10 lives were 14 hours and 13 hours, and core-starting flaking with white structural deformation was produced at the ratio of 10/10 in the specimens of disks.

In the specimens according to Comparative Example 6, the loadings of Si and Mn were small to be 0.02% and 0.03%, and the surface hardness was low to be Hv 699. As a result, the L10 life was 10 hours, and core-starting flaking with white structural deformation was produced at the ratio of 10/10 in the specimens of disks.

In the specimens according to Comparative Examples 8 to 10, since the retained austenite quantity was small to be in a range of from 8% to 10%, surface-starting flaking was also mixed. Particularly in Comparative Example 8, since the content of Cr was large to be 5.6%, bulky Cr carbide the particle size of which was 823 nm was precipitated on the race surface. Thus, the L10 life was 20 hours, and flaking in which core-starting flaking and surface-starting flaking were mixed was produced at the ratio of 10/10 in the specimens of disks.

In the specimens according to Comparative Example 9, since the content of V was large to be 5.12%, fine V carbide and bulky V carbide were mixed so that the average carbide/carbonitride particle size became large to be 721 nm. Thus, the L10 life was 23 hours, and flaking in which core-starting flaking and surface-starting flaking were mixed was produced at the ratio of 10/10 in the specimens of disks.

In the specimens according to Comparative Example 10, since the content of Mo was large to be 4.95%, fine Mo carbide and bulky Mo carbide were mixed so that the average carbide/carbonitride particle size became large to be 880 nm. Thus, the L10 life was 21 hours, and flaking in which core-starting flaking and surface-starting flaking were mixed was produced at the ratio of 10/10 in the specimens of disks.

As is apparent from the above results, by setting the retained austenite quantity to be in a range of from 25% to 45%, the severity of foreign matter dents produced on the race surface is restrained so that it is possible to realize a long-life toroidal-type continuously variable transmission. In addition, by setting the diffusible hydrogen quantity in the steel to be not more than 0.1 ppm, cracking caused by flaking factors can be restrained, and further crack propagation can be delayed under such environment that rolling contact stress and bending stress are mixed.

As has been described above, according to the present invention, it is possible to provide a toroidal-type continuously variable transmission which is high in durability and long in life.

While only certain embodiments of the invention have been specifically described herein, it will apparent that numerous modifications may be made thereto without departing from the spirit and scope of the invention.

What is claimed is:

1. A continuously variable transmission, comprising:
    an input disk interlocking with an input shaft;
    an output disk interlocking with an output shaft; and
    a power roller bearing including an inner race, an outer race and a plurality of rolling elements, said inner race engaging with said input disk and said output disk to thereby transmit power of said input shaft to said output shaft;
    wherein at least one of components of said continuously variable transmission including said inner and said outer races of said power roller bearing, said input disk and said output disk is comprised of an alloy steel material comprising C: 0.15 to 0.5 wt %, Si: 0.1 to 1.5 wt %, Mn: 0.1 to 1.5 wt %, Cr: 0.5 to 3.0 wt %, and at least one kind selected from Mo: 0.1 to 3.0 wt % and V: 0.1 to 3.0 wt %, a content of O in said alloy steel material being set to be not more than 9 ppm,
    wherein the surface of said at least one of components after carbonitriding, hardening and tempering treatments is set to contain C: 0.8 to 1.2 wt % and N: 0.05 to 0.20 wt %,
    wherein said at least one of components has surface hardness of Hv 720 or more, and
    wherein Mo or V carbide/carbonitride, the average particle size of which is in a range of from 50 nm to 500 nm, is dispersed and precipitated on a race surface or in a range of from the race surface to a deep position where a maximum shearing stress is generated.

2. The continuously variable transmission according to claim 1, wherein a retained austenite quantity in said at least one of components surface is set to be in a range of from 20 vol % to 45 vol %.

3. The continuously variable transmission according to claim 1, wherein a diffused hydrogen quantity in said at least one of components is set to be not more than 0.1 ppm.

4. The continuously variable transmission according to claim 1, wherein a diffused hydrogen quantity in said at least one of components is set to be not more than 0.1 ppm, and a retained austenite quantity in said at least one of components surface is set to be in a range of from 20 vol % to 45 vol %.

* * * * *